(12) United States Patent
Pavia et al.

(10) Patent No.: US 7,997,510 B2
(45) Date of Patent: Aug. 16, 2011

(54) SYSTEMS, METHODS AND APPARATUS FOR PROPULSION

(76) Inventors: Thomas Clayton Pavia, Mojave, CA (US); James Robert Grote, Mojave, CA (US)

( * ) Notice: Subject to any disclaimer, the term of this patent is extended or adjusted under 35 U.S.C. 154(b) by 986 days.

(21) Appl. No.: 11/782,631

(22) Filed: Jul. 24, 2007

(65) Prior Publication Data
US 2008/0134667 A1 Jun. 12, 2008

Related U.S. Application Data

(60) Provisional application No. 60/833,198, filed on Jul. 24, 2006.

(51) Int. Cl.
*B64D 33/04* (2006.01)
(52) U.S. Cl. .................. 239/127.3; 239/127.1; 239/131; 60/257; 60/260; 60/267; 60/266; 60/39.53; 60/200.1; 60/204; 60/220
(58) Field of Classification Search ............ 60/257, 60/260, 267, 266, 39.53, 200.1, 204, 220; 239/127.1, 127.3, 131
See application file for complete search history.

(56) References Cited

U.S. PATENT DOCUMENTS

| 3,374,954 A | * | 3/1968 | Card | 239/127.1 |
| 4,055,044 A | * | 10/1977 | Dederra et al. | 239/127.3 |
| 6,052,987 A | | 4/2000 | Dressler | |

FOREIGN PATENT DOCUMENTS

| EP | 0916835 A1 | 5/1999 |
| JP | 11-229964 A | 8/1999 |

* cited by examiner

*Primary Examiner* — Michael Cuff
*Assistant Examiner* — Craig Kim
(74) *Attorney, Agent, or Firm* — Michael G. Smith, Esq.

(57) ABSTRACT

In some embodiments a propulsion system includes a thrust chamber having an inside wall, an expansion nozzle mounted to the thrust chamber and having an interior and having an exterior, a main propellant injector mounted to the thrust chamber to inject a fluid in the interior of the thrust chamber, the fluid comprising oxidizer, fuel and internal film coolant, the internal film coolant ranging from about 1% to about 5% of the fluid, limited coolant tubing circumscribing the exterior of the expansion nozzle to circulate an external coolant, and an injector mounted to the expansion nozzle to inject the external coolant in the interior of the expansion nozzle, the external convective coolant about 2.5% of the fluid. The system operates at lower temperatures while having conventional amounts of thrust, in which the thrust chamber can be made of thin walls of lower cost conventional metals with simple coolant tube construction.

19 Claims, 8 Drawing Sheets

SYSTEMS, METHODS AND APPARATUS FOR PROPULSION

RELATED APPLICATION

This application claims the benefit of U.S. Provisional Application Ser. No. 60/833,198 filed Jul. 24, 2006 under 35 U.S.C. 119(e).

FIELD OF THE INVENTION

This invention relates generally to propulsion systems, and more particularly to rocket engines.

BACKGROUND OF THE INVENTION

In conventional rocket engines, a main propellant injector sprays liquid propellants into a combustion chamber, where the propellants are burned. The burned propellants expand in an expansion nozzle, where the propellants increase in velocity and produce thrust. A thrust chamber encompasses both the combustion chamber and the expansion nozzle.

One of the propellants (usually the fuel) flow through coolant tubes or channels in the thrust chamber. The relatively cool propellant flowing in the coolant tubes or channels cools the thrust chamber and prevents the thrust chamber from failing or melting. These conventional fluid cooled engines are typically called regeneratively cooled engines because the engine uses one of the main propellant to cool the thrust chambers. Examples of regeneratively cooled engines are the Space Shuttle's SSME engine and the Apollo program's F-1 engine.

The thrust chambers of conventional regeneratively cooled engines include large numbers of individual coolant tubes, perhaps dozens to as high as one thousand coolant tubes, and above. The coolant tubes are brazed or welded together side-by-side like asparagus, or the coolant tubes cooling channels are fabricated from large, thick metal shells that require extensive machining, custom tooling, and custom processes to fabricate the fluid cooling channels (i.e. passages) in the thrust chamber. These types of coolant tubes are produced by a small number (perhaps several) of very specialized, high-overhead, expensive fabricators. The cooling system of the thrust chamber is very often a large part of a rocket engine's procurement expense and requires long lead time to manufacture.

In addition, the material temperature inside of the thrust chamber is often typically near or above 1300 degrees Fahrenheit, requiring the thrust chamber to be made of exotic, rare, or expensive materials.

BRIEF DESCRIPTION OF THE INVENTION

The above-mentioned shortcomings, disadvantages and problems are addressed herein, which will be understood by reading and studying the following specification.

In some embodiments a propulsion system includes a thrust chamber having an inside wall, an expansion nozzle mounted to and being part of the thrust chamber and having an interior and having an exterior, a main propellant injector mounted to the thrust chamber to inject a fluid in main propellant fluids into the interior of the thrust chamber, the fluid main propellants including oxidizer and fuel. An internal film coolant is also injected into the thrust chamber interior and the internal film coolant can be injected either from the main propellant injector or from a separate injector for the internal film coolant. The proportion of internal film coolant ranges from about 1% to about 5% of the total fluid flowing into the thrust chamber which includes oxidizer, fuel, and cooling fluids. The total amount of fluid flowing into and through the rocket engine thrust chamber is referred to as "the fluid." Coolant tubing circumscribes the exterior of the expansion nozzle thrust chamber to circulate an external convective coolant, and an injector mounted to the expansion nozzle is operable to inject the external convective coolant in the interior of the expansion nozzle, the external convective coolant being about 2.5% of the fluid but can be other values than 2.5%. The system can operate at lower temperatures while having conventional amounts of thrust, in which the thrust chamber can be made of thin walls of lower cost conventional metals with simple coolant tube construction.

In one aspect, a thrust chamber having a wall of a thickness of between about 0.020 inches and about 0.045 inches.

In another aspect, a propulsion system includes a cooling system and a main propellant injector that is operably coupled to a thrust chamber, the main propellant injector being operably independent from the cooling system.

In yet another aspect, a cooling system includes cooling tubes consisting of a few coolant tubes circumscribing an exterior of the thrust chamber and operable to circulate an external convective coolant.

In still another aspect, wherein a thrust chamber comprises metal selected from the group consisting of aluminum, stainless steel, copper, an austenitic nickel-based superalloy, alloys, metal composites, plastic composites thereof and mixtures thereof were applicable.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, apparatus of embodiments are described. In the third section, embodiments of methods are described. In the fourth section, hardware and the operating environments in conjunction with which embodiments may be practiced are described. Finally, in the fifth section, a conclusion of the detailed description is provided.

System Level Overview

Figure 1:
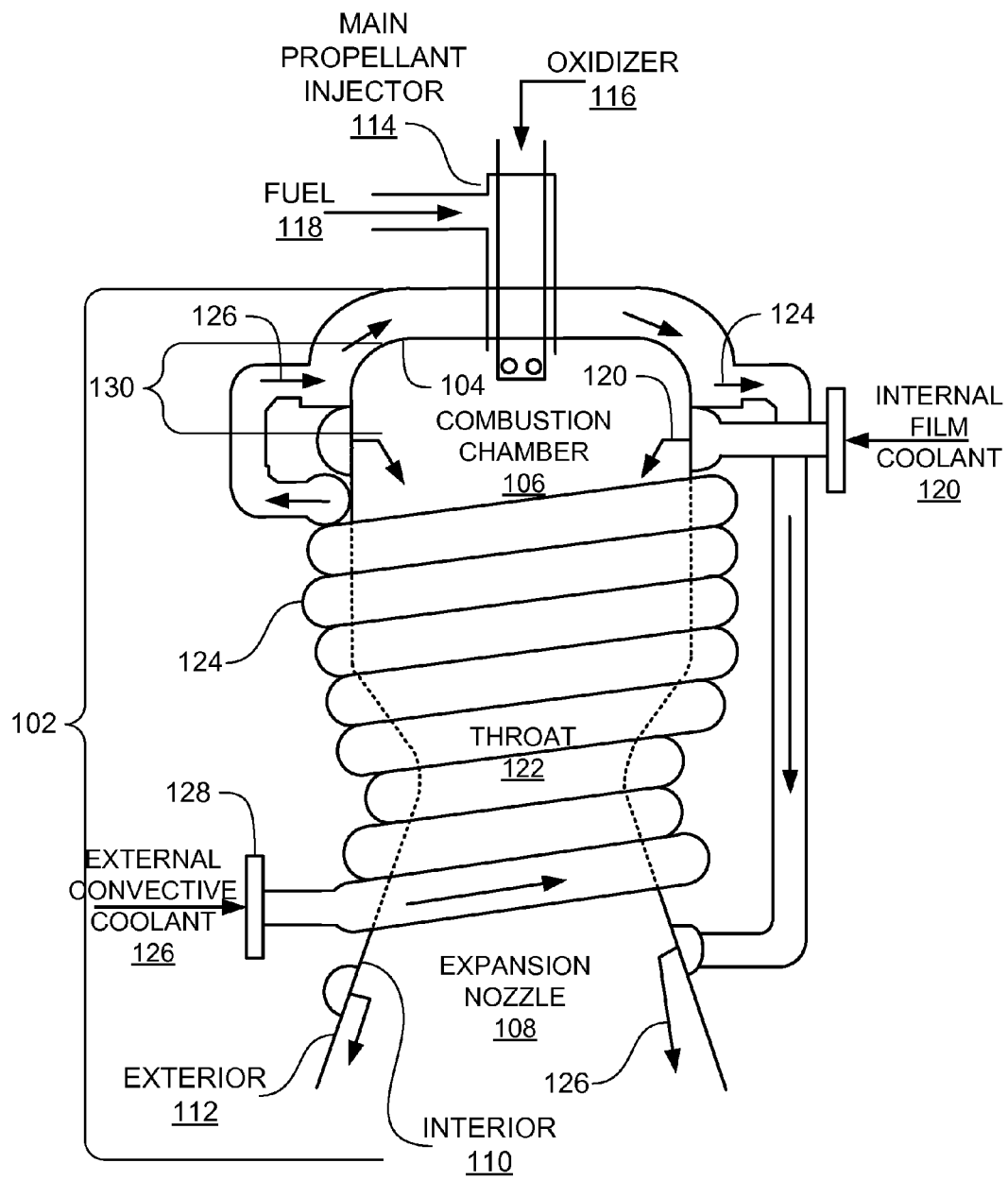
FIG. 1 is a cross section side-view block diagram of an overview of a propulsion system.

FIG. 1 is a cross section side-view block diagram of an overview of a propulsion system 100. Propulsion system 100 solves the need in the art for a rocket engine cooling system that does not require extensive machining, custom tooling and fabrication custom processes.

Propulsion system 100 includes a thrust chamber 102 having a shell 130 with an inside wall 104. The thrust chamber 102 is the combination of the combustion chamber 106 and the expansion nozzle 108. The expansion nozzle 108 has an interior 110 and has an exterior 112. The inside wall 104 of the combustion chamber is also known as the "hot wall" or the "hot-gas-side" wall. The shell 130 is a thin metal structure that forms the most significant, but not only, structural element that forms the thrust chamber.

The thrust chamber 102 is the portion of the rocket engine that is downstream of a main propellant injector 114. In some embodiments, the main propellant injector 114 is a pintle injector as shown in FIG. 1. The main propellant injector 114 is operably coupled to the thrust chamber 102. The main propellant injector 114 is also operable to inject a fluid of the main propellants into the interior volume in the inside wall 104 of the thrust chamber 102 and in some embodiments an internal film coolant 120 is injected and in some embodiments the internal film coolant 120 is not injected. If the main propellant injector does not inject the internal film coolant 120 then that coolant can be injected by separate injector that injects only internal film coolant. The fluid main propellant includes oxidizer 116 and fuel 118. The fluid flowing into and through the thrust chamber includes the oxidizer 116, fuel 118, all cooling fluids that cool the inside wall of the thrust chamber and any additional cooling fluids and internal film coolant 120. The internal film coolant 120 is often known as "coolant A." The main propellants can be a mono-propellant, or a plurality of main propellants.

When injected, the internal film coolant 120 spreads into a thin film on the inside wall 104. The function of internal film coolant 120 is two-fold: 1) to absorb heat directly as a coolant, thus reducing heat flow to the inner chamber wall (and reducing wall temperature), and 2) to deposit carbon in the form of "carbon black" or soot on the inner surface of the engine's thrust chamber 102 (i.e. a process called "coking"), the soot being an insulator with very low thermal conductivity and will greatly reduce the amount of heat that flows through the thrust chamber 102 (and into an external convective coolant 126 described below).

Figure 2:
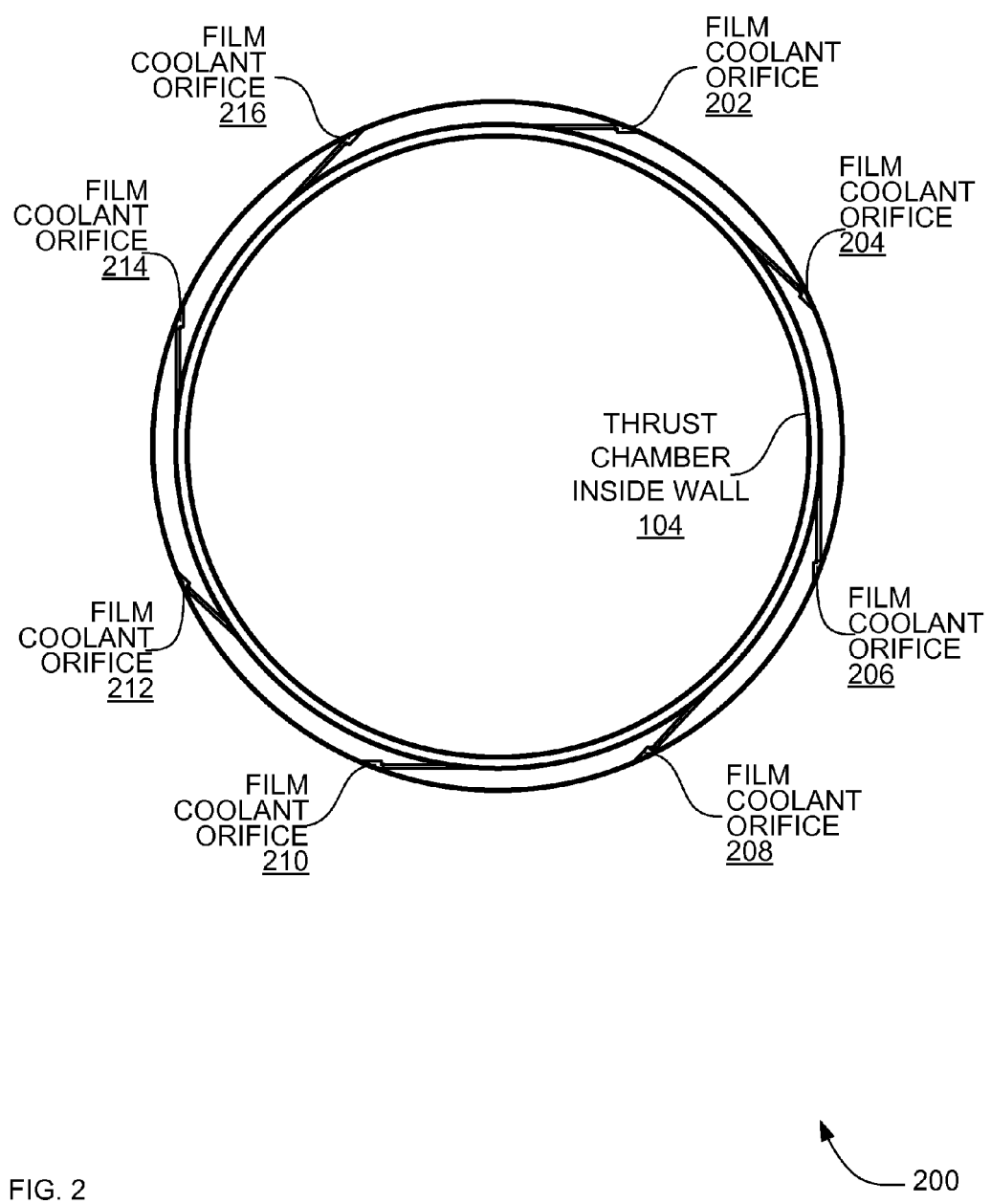
FIG. 2 is an example cross section top-view block diagram of combustion chamber apparatus having film coolant orifices, according to an embodiment.

The main propellant injector 114 is similar to a showerhead that sprays liquid propellants, such as an oxidizer 116 of liquid oxygen and a fuel 118 of jet fuel, into the combustion chamber 106 where the oxidizer 116 and fuel 118 are burned. After combustion, the burned propellants expand in the expansion nozzle 108 where the burned propellants increase to high velocity and produce thrust. The internal film coolant 120 provides protection from excessive heat by introducing a thin film of coolant or propellant through orifices around the injector periphery or through manifolded orifices (as shown in FIG. 1 and FIG. 2) in the thrust chamber inside wall near the main propellant injector 114 or chamber throat region 122 or anywhere else in the thrust chamber 102 where internal film coolant is needed or desired. The liquid propellants can be a mono-propellant, or a plurality of liquid propellants.

Propulsion system 100 also includes one or more coolant tube(s) 124 that circumscribes the exterior 112 of the thrust chamber 102. The one or more coolant tube(s) are operable to circulate an external convective coolant 126. The external convective coolant 126 is often known as "coolant B." In some embodiments of systems 100, the number of coolant tubes is a small number of coolant tubes, such as four or five coolant tubes and a few coolant tubes as two coolant tubes. In some embodiments of system 100, system 100 includes only one coolant tube. In some embodiments, system 100 includes a few coolant tubes. In some embodiments, a plurality of coolant tubes consists of a few coolant tubes. In some embodiments, a plurality of coolant tubes consists essentially of a few coolant tubes.

The one or more coolant tube(s) 124 circumscribes the exterior 112 of the thrust chamber 102 starting at the expansion nozzle 108 at any area ratio, but an area ratio of 2 or 3 can be considered typical. The one or more coolant tube(s) 124 surrounds the upper part of the expansion nozzle and continues up towards the combustion chamber (102) like a coil, until the coolant tube(s) reaches the top of the combustion chamber 106, after which the one or more coolant tube(s) 124 is redirected downward to the expansion nozzle 108, where the coolant tube(s) directs the external convective coolant (water as an example) into the nozzle as an internal film coolant or as a dump coolant to cool that portion of the expansion nozzle 108 not cooled by the one or more coolant tube(s) 124.

Propulsion system 100 also includes an injector 128 that is operably coupled to the expansion nozzle 108. The injector 128 is operable to inject the external convective coolant 126 in the interior 110 of the expansion nozzle 108.

An alternative option to using a single-layer shell with a tube(s) wrapped around the shell is two shells having a gap in between the two shells for the external convective coolant to flow within the gap. The two shells can be secured directly or indirectly to each other at their two ends (e.g. top and bottom ends) or the two shells can be secured to each other at many points throughout the surface area using any means necessary including bolts, rivets, welds, brazing, or any other means. In addition, spacers and/or ribs of any configuration can be built into or added to the shells anywhere to maintain proper shell spacing and/or to ensure sufficient shell structural characteristics.

To strengthen the thrust chamber structure, the outer surface of the external coolant tube and/or shell(s) can be overwrapped with filament winding or other composite material including, but not limited to graphite/epoxy, Kevlar/epoxy, glass/epoxy, metal wire/epoxy, and others including nonepoxy based composites.

The shell(s) can be fabricated using conventional methods of shell fabrication. The shell has sufficient strength and heat conductivity needed to conduct heat to the external convective coolant without overheating and/or failure. Methods of shell construction include, but are not limited to, spinning, welding, stamping, punching, extruding, explosive forming, drawing, plasma spraying, electroplating, brazing, riveting, and other methods.

As an option for construction of the thrust chamber, the thrust chamber can be fabricated in a similar way to a conventional regeneratively cooled thrust chamber: with numerous parallel coolant tubes brazed, electroplated, welded, or soldered together (or other methods) with or without a metal jacket or filament overwrapping on the exterior surface. Or, the thrust chamber can be fabricated like another type of regeneratively cooled thrust chamber using cooling channels as opposed to tubes and fabricated using electroplating, plasma spraying, or other methods.

A top portion of the combustion chamber 106 is known as a dome 130. The dome shown in system 100 is a double-walled thrust chamber dome 130 with water flowing between the two walls of the double-walled dome 130 and cooling the dome 130. The water flows from the one or more coolant tube(s) 124 to the interior of the dome's double-shell and then into the coolant tube(s) 124 again as the water flows to the expansion nozzle 108 where the water film-cools the expansion nozzle 108. The dome 130 can either be a simple double-shell where both walls (or shells) of the dome 130 are unattached to each other (except at the ends), or the two walls can be attached to each other with rivets, bolts, welding, brazing, electroplating, or plasma spraying, or any other process. The dome 130 can also have coolant flow channels fabricated into the dome 130, or no channels at all.

The proportions of the internal film coolant 120 and external convective coolant 126 provide for a high degree of thrust while maintaining relatively low temperatures in the thrust chamber 102. Cooling of the thrust chamber is accomplished while sustaining acceptably low values of losses to thrust. The combination of sufficiently high thrust and low temperatures avoids the need for a large number of expense expensive individual coolant tubes that are difficult to manufacture. As a result, system 100 uses a minimal number of coolant tubes. System 100 greatly minimizes the number of fluid coolant tubes 124 necessary to cool the thrust chamber 102 to at most, several coolant tubes at the most, which greatly simplifies and expedites fabrication of the thrust chamber 102 using conventional and simple fabrication techniques, such as fabrication techniques that involve spinning and winding, stamping and welding, and explosion forming and welding.

In one example, the thrust chamber 102 can be manufactured using the following process:

1.) Select shell material.
2.) Anneal the shell material.
3.) Spin shell material into appropriate shapes including the dome, cylindrical section of the combustion chamber, the conical section, and the expansion nozzle.
4.) Anneal the spun shell components again.
5.) Machine the internal and external film coolant manifolds.
6.) Weld thrust chamber shell components together. Install spacers and/or stiffeners in the double wall dome as required.
7.) Grind off excess weld.
8.) Wind external coolant tube around thrust chamber with brazing compound. Brazing compound can be heat solidified during welding or solidified all at once in a brazing oven. Heat the tubing as required for appropriate softness during winding.
9.) Braze external coolant tube to appropriate injection manifolds.

In addition, the lower temperatures in the thrust chamber 102 avoids the need for thick walls of the thrust chamber. Thus system 100 provides a simple thin metal shell structure as a thrust chamber 102, as shown in FIG. 2. below.

System 100 provides a low-cost fluid cooled rocket thrust chamber 102 that is easy to fabricate. System 100 includes a greatly simplified light-weight, fluid-cooled thrust chamber 102 that can be used in conjunction with any kind of rocket engine main propellant injector 114, any size rocket engine (thrust size), or utilizing any propellant combination.

In one example, the amount of internal film coolant 120 that is introduced or injected into the inside wall 104 of the thrust chamber 102 is typically in a range of about 1% to about 5% of the total fluid flow to the engine (i.e. the 'fluid') but other values can be used. In another example, the amount of internal film coolant that is introduced or injected into the inside wall 104 of the thrust chamber 102 is about 2.5% of the fluid. In yet another example, the amount of internal film coolant that is introduced or injected into the inside wall 104 of the thrust chamber 102 is about 3.5% of the fluid. In yet a further example, the amount of external convective coolant 126 that is introduced or injected into the interior 110 of the expansion nozzle 108 is typically will fall in a range of 1% to 5% of the fluid but other values can be used. In still yet another example, the amount of internal film coolant that is introduced or injected into the inside wall 104 of the thrust chamber 102 is about 3.5% of the fluid and the amount of external film coolant 126 that is introduced or injected into the interior 110 of the expansion nozzle 108 is about 2.5% of the fluid. Typical expected values for both the internal film coolant 120 and the external convective coolant 126 can be 3.5% and 2.5% of total fluid flow respectively.

While the system 100 is not limited to any particular thrust chamber 102, inside wall 104, combustion chamber 106, expansion nozzle 108, expansion nozzle interior 110, expansion nozzle exterior 112, main propellant injector 114, oxidizer 116, fuel 118, internal film coolant 120, one or more coolant tube(s) 124, an external convective coolant 126 and an injector 128, for sake of clarity a simplified thrust chamber 102, inside wall 104, combustion chamber 106, expansion nozzle 108, expansion nozzle interior 110, expansion nozzle exterior 112, main propellant injector 114, oxidizer 116, fuel 118, internal film coolant 120, one or more coolant tube(s) 124, an external convective coolant 126 and an injector 128 are described.

Apparatus Embodiments

In the previous section, a system level overview of the operation of an embodiment was described. In this section, particular apparatus of such an embodiment are described by reference to a series of diagrams.

Figure 3:
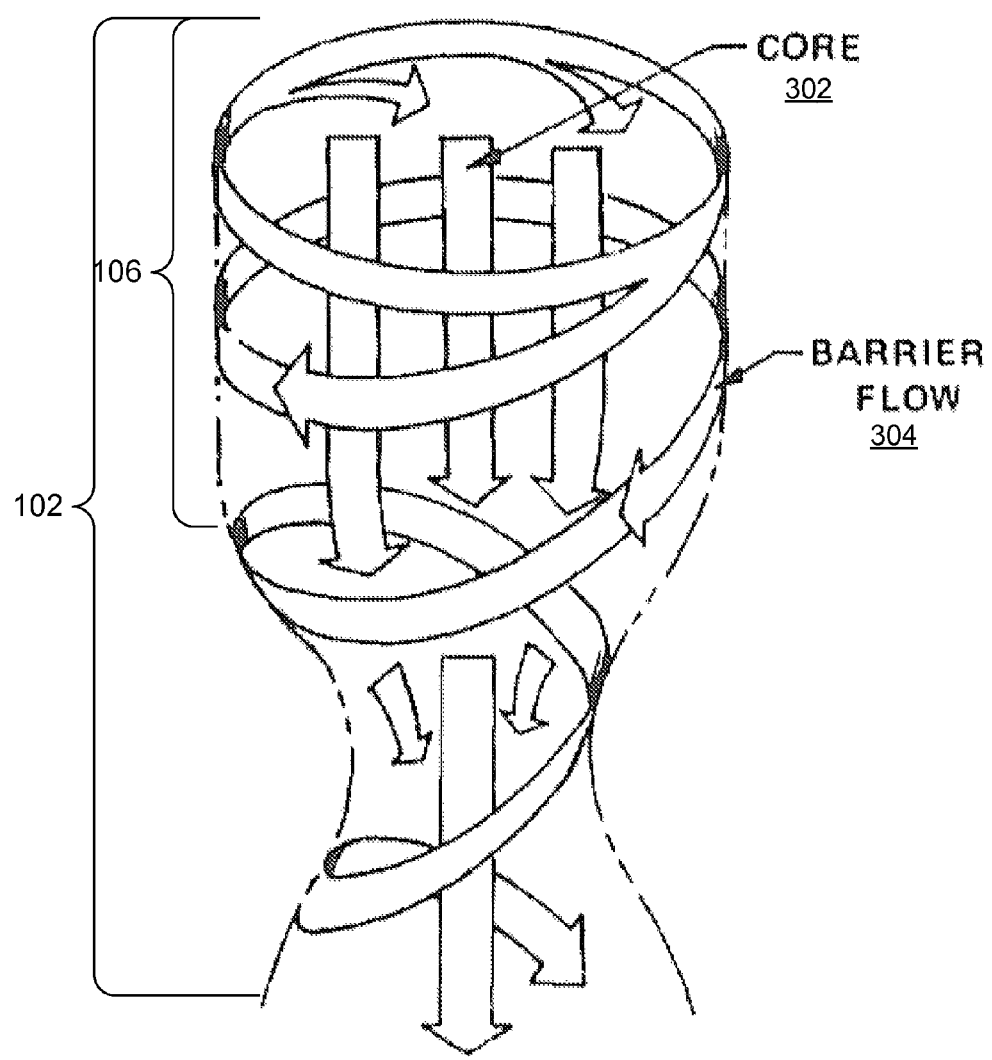
FIG. 3 is an isometric block diagram of a thrust chamber that shows a swirling flow of a layer of internal film coolant along the thrust chamber inside wall, according to an embodiment.

FIG. 2 and FIG. 3 show examples of a vortex injection pattern for internal film coolant film injection onto a hot chamber wall. Other patterns and methods for injecting internal film coolant are also possible.

FIG. 2 is a cross section top-view block diagram of combustion chamber apparatus 200 having film coolant orifices, according to an embodiment. Apparatus 200 provides a light-weight rocket engine of any size while using low-cost fabrication methods and inexpensive, non-exotic materials. Thus, apparatus 200 simplifies and expedites the production of a fluid-cooled rocket engine thrust chamber 102. Apparatus 200 helps solve solves the need in the art for a thrust chamber made of less expensive materials and manufacturing processes.

Apparatus 200 includes one or more film coolant orifices that inject a internal film coolant fluid onto the inside wall of a thrust chamber 102. In some embodiments, the fluid is external convective coolant 126 that is injected into the interior 110 of the expansion nozzle 108. Apparatus 200 includes eight film coolant orifices 202, 204, 202, 206, 208, 210, 212, 214 and 216. However the orifices can be any shape, number, size, or orientation, and can be located any where in the thrust chamber where coolant is needed. The internal film coolant fluid can be any coking fluid or non-coking fluid.

The injection of the fluid through the orifices and onto the inside wall of the thrust chamber 102 maintains the inside wall at modest temperatures, such as temperatures below 1300 degrees Fahrenheit. Temperatures below 1300 degrees Fahrenheit do not require exotic, rare, or expensive materials. Instead, low-cost and readily available materials that maintain their strength at low-to-medium temperatures (below 1300 degrees Fahrenheit) can used for the thrust chamber. For example, the thrust chamber can be made of aluminum, steel, stainless steel, Inconel®, copper, bronze, alloys thereof, mixtures thereof, and metal composites and plastic composites. In some embodiments, the thrust chamber can be made of aluminum, stainless steel, Inconel®, alloys thereof and mixtures thereof. In some embodiments, the thrust chamber can be made of copper. Inconel® is a registered trademark of Special Metals Corporation of New Hartford, N.Y., referring to a family of austenitic nickel-based superalloys. Inconel® alloys are oxidation and corrosion resistant materials well suited for service in extreme environments. When heated, Inconel® forms a thick, stable, passivating oxide layer protecting the surface from further attack. Inconel® retains strength over a wide temperature range, which is helpful in implementations where aluminum and steel can soften. The heat resistance of Inconel® is developed by solid solution strengthening or precipitation strengthening, depending on the alloy.

The relatively low temperatures in the thrust chamber 102 also allows for a thrust chamber having a shell wall thickness typically (but not always) of between about 0.020 inches and about 0.045 inches. Other thicknesses can be used as well. In some embodiments, the thrust chamber wall thickness is between about 0.030 inches and about 0.040 inches. In some embodiments, the thrust chamber wall thickness is about 0.030 inches.

The thrust chamber of FIG. 1 and FIG. 2 is far less elaborate than conventional fluid cooled chambers, and operates at low-to-medium inner surface temperatures on the inside wall 104 (i.e. below about 1300 degrees Fahrenheit), approximately the exhaust temperature of high-performance internal combustion automotive engines, so that low-cost materials which would have low strength at elevated temperatures (i.e. above 1300 degrees Fahrenheit) can be used in the composition of the thrust chamber 102. Thus, the thrust chamber 102 is much easily produced by many more potential low-cost, low-overhead, commercial vendors that currently exist in industry.

FIG. 3 is an isometric block diagram of a thrust chamber that shows a swirling flow of a layer of internal film coolant along the thrust chamber inside wall, according to an embodiment.

In FIG. 3, internal film cooling fluid is injected tangentially into the combustion chamber of the thrust chamber. Core flow 302 from main propellants is inside the swirling surface flow and parallel to the engine long axis. This method of internal film coolant injection in an example only since any injection method can be used so long as the coolant is distributed over those areas requiring film coolant. The main propellants can be a mono-propellant, or a plurality of main propellants.

Tangential injection of fluid shown in FIG. 2 above creates a swirling flow 304 of the internal film coolant 120 layer against or along the thrust chamber inside wall 104. The swirling flow 304 can also be described as a vortex flow resulting from the injection method shown in FIG. 2.

The thrust chamber inside shell wall 104 is also known as a "hot wall" because the heat of the combustion is generated inside of the thrust chamber 102. More specifically, the heat of combustion is generated inside of the combustion chamber 106.

Figure 4:
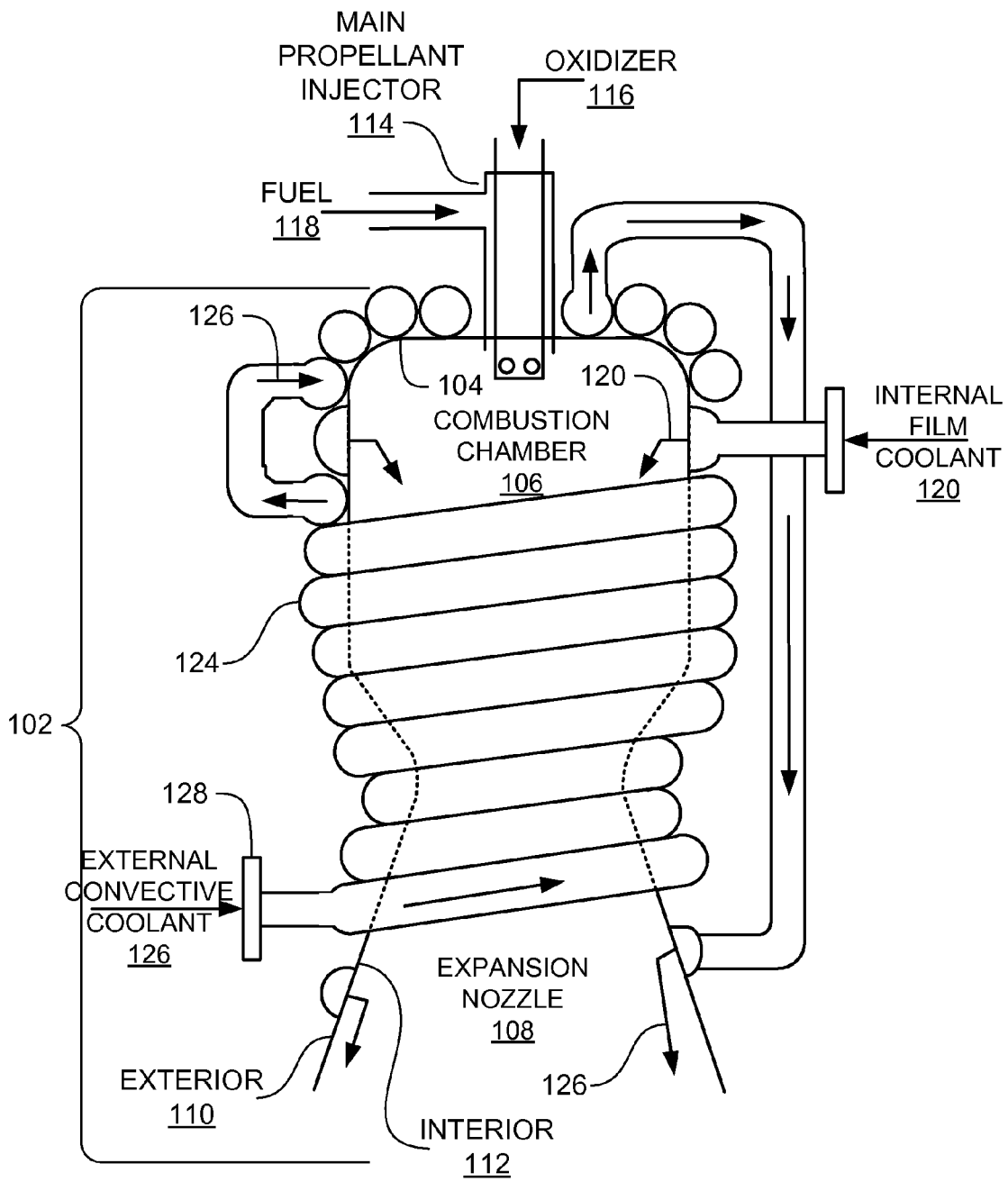
FIG. 4 is a cross section side-view block diagram of a propulsion apparatus, according to an embodiment having a single-walled dome and spiraling cooling tubes on the dome.

FIG. 4 is a cross section side-view block diagram of a propulsion apparatus 400, according to an embodiment having a single-walled dome and spiraling cooling tubes on the dome. The apparatus of FIG. 4 is substantially similar to that shown in FIG. 1, except that in FIG. 4, the dome has a single wall and the spiraling cooling tubes continue upwards to cover the dome. In FIG. 4, both the thrust chamber 102 and dome 130 are cooled by external coolant tubes.

In FIG. 4, cooling of the expansion nozzle 108 is accomplished as follows: After cooling the bulk of the thrust chamber 102 by flowing external convective coolant 126 in the one or more coiled coolant tube(s) 124, the external convective coolant 126 is then injected as a film coolant along the hot wall of the expansion nozzle 108 or as a dump coolant in order to cool the expansion nozzle 108. Because the expansion nozzle 108 is of low static pressure as compared to the combustion chamber 106, on the order of 10-30 times less, the pressure and boiling point ranges of the external cooling system available with which the propulsion system 400 can be manufactured and operated are very broad. Therefore, pressure of the external convective coolant 126, and in turn, heat absorbing capacity of the external convective coolant 126, can be selected to optimize the amount of external convective coolant 126 for a given type of engine. The broad range of the pressure of the external convective coolant 126 at which the propulsion system 400 can be manufactured for and operated at provides a variety of operating scenarios such as increasing the external convective coolant 126 system pressure in order to increase the heat absorbing capacity and thus decrease the amount of external convective coolant 126 that is required, or of decreasing the external convective coolant 126 system pressure to decrease the tankage and pressurant gas weight of the external convective coolant 126 in a "pressure-fed" rocket system or to decrease pumping horsepower requirements (if a system that uses a pump to pressurize the external convective coolant is used). Cooling the nozzle as described in FIG. 4 simplifies the design of a nozzle extension. The nozzle extension is the portion of the expansion nozzle 108 that is downstream of the injection point of the external convective coolant 126 in the expansion nozzle 108. In the example of FIG. 4, the nozzle extension is fabricated of a simple thin sheet metal or a metal or plastic composite material.

The pintle injector embodiment of the main propellant injector 114 that is shown in FIG. 1 and FIG. 4 was originally developed by TRW in the early 1960's. The dome 130 of a propulsion system using a pintle injector is the top of the thrust chamber 102. The dome 130 in FIG. 4 is a single metal shell that has the one or more coolant tube(s) 124 (or tubes) continuing to wind around the dome 130 in a spiral path and bonded (using soldering, brazing, or other methods) to an outer surface of the dome 130. The double-walled dome 130 shown in FIG. 1 is unnecessary when a single-walled dome shell with the one or more coolant tube(s) 124 is bonded (soldered, brazed, or other methods) to an external surface of the single-walled dome. The dome 130 of FIGS. 1, 4 and 5 can be dome-shaped, conical, flat, or other shapes.

Figure 5:
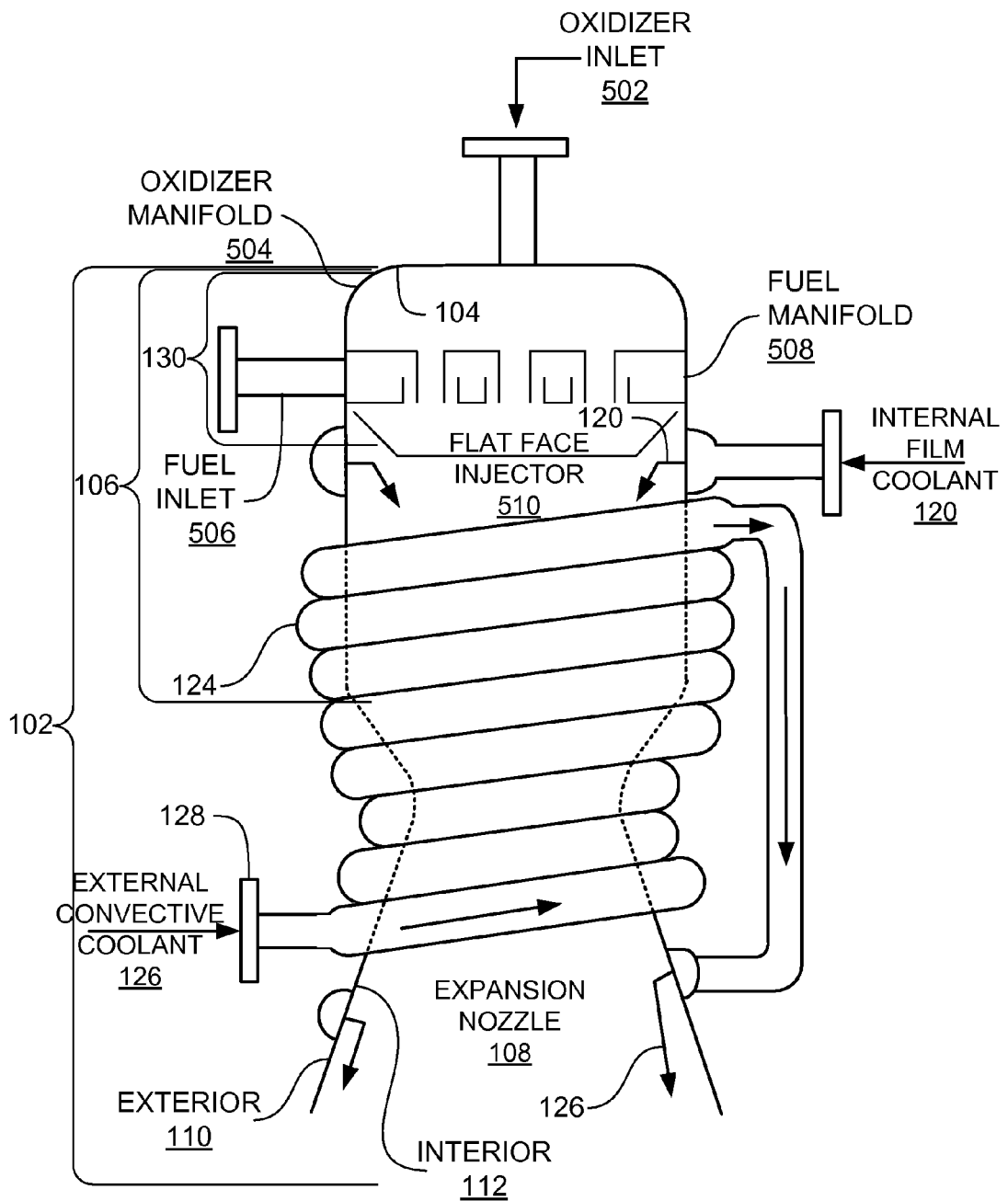
FIG. 5 is a cross section side-view block diagram of propulsion apparatus including a flat-faced injector and a fluid-cooled thrust chamber, according to an embodiment.

FIG. 5 is a cross section side-view block diagram of propulsion apparatus 500 including a flat-faced injector and a fluid-cooled thrust chamber, according to an embodiment. Apparatus 500 includes an oxidizer inlet 502 for regulating introduction of an oxidizer in the combustion chamber 102.

Apparatus 500 also includes an oxidizer manifold 504. Apparatus 500 also includes a fuel inlet 506, a fuel manifold 508 and a flat-face main propellant injector 510. The flat-face main propellant manifold 510 injects the main propellants into the combustion chamber and sometimes injects internal film coolant when the internal film coolant is not injected into the combustion chamber through a film coolant injector that is separate from the flat-face main propellant manifold 510. As an option the manifold for the internal film coolant can be built into the circumference of the flat-face main propellant injector (as orifices formed in the perimeter of the flat-face of the flat-face injector) or the internal film coolant manifold can be a separate manifold as shown in FIG. 5. Other implementations use other means of injecting internal film coolant 120. The main propellants can be a mono-propellant, or a plurality of main propellants.

In apparatus 500, internal film coolant 120 is routed into an injection manifold that is separate from the flat-face main propellant manifold 510. In this example the internal film-coolant injection manifold is an external tube manifold that forms a film-coolant injection ring around the base of dome 130 of the combustion chamber 106. Internal film coolant 120 is injected through holes of the film-coolant injection manifold 510 into the combustion chamber 102.

External convective coolant 126 is fed into the coolant tube(s) 124. The external convective coolant 126 passes in-between double walls (not shown) of the thrust chamber 102 the dome and then is injected in the expansion nozzle 108 where external convective coolant 126 expands to a gas to cool the expansion nozzle 108. In some embodiments, a pintle injector is used as a main propellant injector 114. In other embodiments, other fuel injectors are used as the main propellant injector 114

In some embodiments that use a film-coolant flat-face injection manifold 510, an external convective coolant 126 is not used to cool the thrust chamber 102.

Apparatus 500 can be implemented in other types of rocket engines, such as the Space Shuttle SSME and the Apollo J-2, H-1, and F-1 engines. The Space Shuttle SSME and the Apollo J-2, H-1, and F-1 engines do not have a thrust chamber dome 130 at the top of the combustion chamber 106 similar to the pintle injector engine, rather these engines have a flat-face main propellant injector 510 with a number of holes in it, as a conventional bathroom shower-head often does. With this type of engine design, the thrust chamber cooling system is similar to that of the previously described cooling system for the pintle injector engine with the exception that there is no thrust chamber dome 130 to cool with the external convective coolant. However, such flat-face injector rocket engines can include a propellant dome or an oxidizer dome at the top of the thrust chambers. The propellant dome or oxidizer dome can have the effect of directing propellant (usually the oxidizer) to a main propellant injector and are not included in the thrust chamber 102 in a location or a position that exposes the propellant directly to hot combustion gases. Because the propellant is not directly exposed to hot combustion gases before introduction to the main propellant injector, no or little cooling is required of the main propellant. Such structures are not confused with a thrust chamber dome 130. The propellant can be a mono-propellant, or a plurality of propellants.

The systems, methods and apparatus described herein are not limited by particular embodiments. For example, variations of the thrust chamber 102, which can include any of variety shape of combustion chamber 106 including the conventional cylindrical combustion chambers and spherical combustion chambers, such as in the German WW2 V2 rocket engine.

In other examples of non-limiting variations, the external convective coolant 126 can flow in the one or more coolant tube(s) 124 in either the "up" or "down" directions. More specifically, as shown in FIGS. 1, 2 and 5, the one or more coolant tube(s) 124 can begin at the expansion nozzle 108 and flow upwards towards the main propellant injector 114 (i.e. counter-current flow), or the one or more coolant tube(s) 124 can begin flowing near the injector-end of the engine and flow downward towards the expansion nozzle 108 where the external convective coolant 126 is injected into the expansion nozzle 108.

In other examples of non-limiting variations, the external convective coolant 126 is circulated in the external coolant tube(s) 124 in a liquid state (all liquid), as a boiling liquid (two phase fluid), or in a gaseous state (as a gas or vapor), or in any combination of these three fluid states.

Although FIGS. 1, 2 and 5 show a single external convective coolant 126, in other examples of non-limiting variations, the one or more coolant tube(s) 124 wind around the thrust chamber 102; two, several, or more coolant tube(s) 124 can be wound around the thrust chamber 102 in parallel to each other; or, alternatively, a small number of stacked tubes (toruses) can be connected together by two (or a few) vertical manifolds providing inlet(s) and outlet(s) for each ring. In other examples of non-limiting variations, each of the coolant tube(s) 124 flow external convective coolant 126, and the coolant tubes 124 are bonded in place using soldering, welding, brazing, or other methods. The exact number and configuration of one or more coolant tube(s) 124 are various.

In other examples of non-limiting variations, the one or more coolant tube(s) 124 can be of any material, wall thickness, or shape in cross-section as long as the coolant tubes transfer the heat that emits flows through the thrust chamber 102 to the external convective coolant 126. Other embodiments of the coolant tubes 124 include copper, stainless steel, Inconel, steel, aluminum, and nickel or alloys of all of these materials or other materials. In other examples of non-limiting variations, the cross-section shape of the coolant tube(s) 124 can be circular, square, octagonal, hexagonal, round on one side and flat on the other, oval, or any other shape that will carry fluid.

In other examples of non-limiting variations, the one or more coolant tube(s) 124 are modified to be a half-tube, as opposed to the full perimeter tube described in FIGS. 1, 2 and 5, that is bonded (i.e. soldered, brazed, welded, or other attachment method) to the thrust chamber 102 exterior wall. The half-tube is a coolant tube 124 tube that has been split in half along length of the coolant tube 124 and is wound around the thrust chamber 102 as shown by the full diameter coolant tube(s) 124 in FIGS. 1, 2 and 5. Like a full tube, the half-tube can be of any cross-sectional shape so as long as coolant tube 124 transfers allows the heat flowing through the thrust chamber 102 to be transferred to the external convective coolant 126. The half-tube coolant tube 124 is bonded to the thrust chamber 102 with an open side facing the thrust chamber 102, thus forming a flow passage for external convective coolant 126. Any cross-sectional shape of coolant tube can be used including but not exclusive to a circle, square, rectangular, round on one side and flat on the other, octagonal, hexagonal, and others, or any combination of these and others.

In other examples of non-limiting variations, either or both of the internal film coolant 120 and the external convective coolant 126 can be different types of fluid than those that make up the main propellants. In one aspect briefly described in FIG. 1, dual coolants are used for the internal film coolant 120 and the external convective coolant. For example, in a liquid oxygen/hydrogen engine, the internal film coolant 120 can be one of many different coking fluids, and the external convective coolant 126 can be hydrogen, water or other non-coking fluid, that is the external convective coolant is non-coking at the maximum temperature is achieves when in the external coolant tube. In some embodiments, the minimization of the number of one or more coolant tube(s) 124 is achieved in part because of the dual use of two kinds of cooling fluids: a "coking" coolant (e.g. the internal film coolant 120) and a "non-coking" external convective coolant 126. The dual coolants are described in greater detail in conjunction with FIG. 6 below. The main propellants can be a monopropellant, or a plurality of main propellants.

As an alternative to cooling the thrust chamber dome with wrapped coiled external coolant tubes or a double wall dome, the dome can be cooled with a conventional ablative material mounted to the inside surface of the dome. In another option the thrust chamber dome can be transpirationally cooled (as in conventional transpiration cooling), or the thrust chamber dome can be uncooled if the main propellant injector 114 causes the steady-state temperature of the dome to be low enough to operate without a cooling system.

The external coolant tube(s) can be any shape, material, or wall thickness so long as the tube(s) can adequately absorb the heat being conducted through the wall of the thrust chamber.

It is an option that the external convective coolant conductive and internal film coolants can, as per the preferences of the designer, be modified with any type of additives that the designer sees fit. Variations can include, but are not exclusive to, changing the boiling or freezing points of the fluids or the viscosity of the fluids or other properties.

This type of rocket thrust chamber 102 recirculating cooling system can be used to cool any type of rocket engine thrust chamber 102, whether the engine receives main propellants delivered as a pressure-fed rocket engine (i.e. main propellants fed to the engine solely by pressurizing the main propellant tanks) or whether the rocket engine is pump-fed (i.e. where the main propellants are fed to the engine by a pump or pumps, usually but not always a turbopump/turbopumps). If implemented as shown in FIG. 2 the thrust chamber 102 cooling system can operate completely independently of the turbopump system making development of both systems easier and less costly.

Method Embodiments

In the previous section, apparatus of the operation of an embodiment was described. In this section, an embodiment of a particular method is described by reference to a flowchart.

Figure 6:
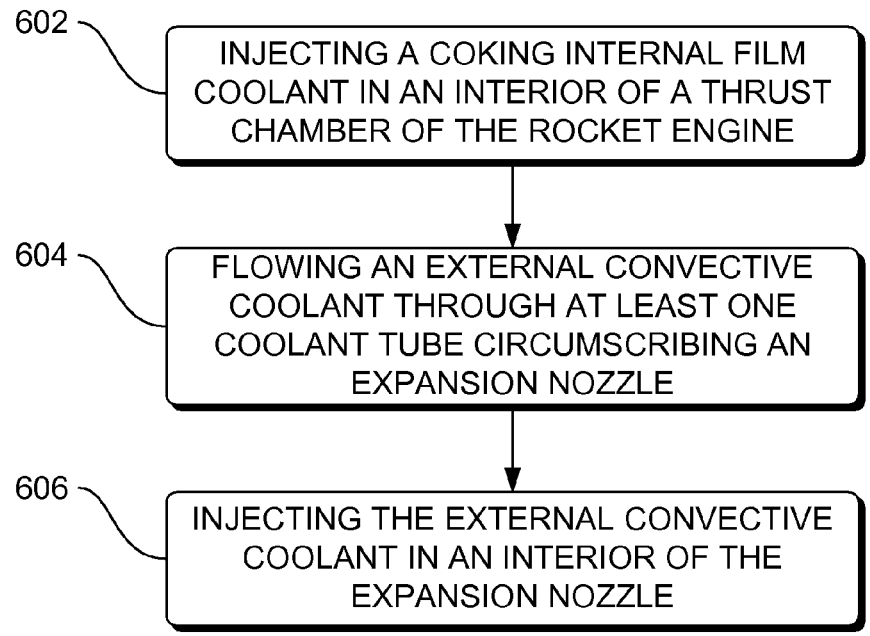
FIG. 6 is a flowchart of a method to cool a rocket engine according to an embodiment.

FIG. 6 is a flowchart of a method 600 to cool a rocket engine according to an embodiment. Method 600 includes injecting an internal film coolant in an interior of a thrust chamber of the rocket engine, at block 602.

Some embodiments of method 600 also include circulating an external convective coolant 126 through one or more coolant tube(s) 124 circumscribing an expansion nozzle 108 thrust chamber of the rocket engine, at block 604.

Method 600 also includes injecting the external convective coolant 126 in an interior of the expansion nozzle 108, at block 606. The internal film coolant 120 and the external convective coolant 126 are injected in various proportions described in FIG. 1.

In one embodiment briefly described in FIG. 1 and FIG. 5 above, dual coolants are used for the internal film coolant 120 and the external convective coolant. "Coking" hydrocarbon internal film coolant 120 flows on the inner wall surface 104 (the hot wall side) of the thrust chamber 102 and an external convective coolant 126 flows on the exterior 112 of the thrust chamber 102 inside the one or more coolant tube(s) 124. In some embodiments, the internal film coolant 120 minimizes the amount of external convective coolant 126 required.

After coiling around the thrust chamber 102, the one or more coolant tube(s) 124 releases the external convective coolant 126, along the inside surface of the expansion nozzle 108 where the external convective coolant 126 cools the expansion nozzle 108 as a film coolant or as a dump coolant.

The dual coolants include a coking, hydrocarbon internal film coolant 120, (usually a fuel as listed below) that absorbs heat, and that in turn, decreases the amount of heat that is absorbed by the thrust chamber 102 by carbon deposition and heat absorption. The heat that is absorbed by the thrust chamber 102 is then absorbed by the external convective coolant 126, that flows in one or more coolant tube(s) 124 attached to the exterior surface of the thrust chamber 102.

In other examples of non-limiting variations, a coking or hydrocarbon internal film coolant 120 is a fuel such as jet fuel (like Jet-A or JP-4), kerosene and kerosene-based fuels, rocket fuel (such as RP-1), propane, butane, and/or liquid or gaseous methane or others. In that variation block 602 of method 600 includes spraying a certain amount of coking internal film coolant 120 against the inside 104 (hot) wall surface of the rocket engine thrust chamber 102 downstream of the main propellant injector 114 and the total cooling fluids. The amount of coking internal film coolant 120 is approximately 1 to 5 percent of the total fluid flow to the propulsion system, including the main propellants that can flow through the main propellant injector 114. The amount of internal film coolant 120 can vary beyond the range of 1 to 5 percent. The deposition of carbon is a result of the decomposition of coking internal film coolant 120 by the heat that the coking internal film coolant absorbs from the propellant burning within the thrust chamber 102. The internal film coolant 120 can be injected into the thrust chamber 102 in either the liquid, boiling, or gaseous states as long as the coking internal film coolant 120 deposits carbon on the inside 104 hot-side surface of the thrust chamber 102.

The reduction of heat flow that results from the deposition of carbon from the internal film coolant 120 means that less heat will flow through the thrust chamber 102 and less external convective coolant 126 will be required on the outside of the thrust chamber 102 to absorb it. Thus a coking hydrocarbon (carbon depositing) internal film coolant 120 film coolant results in less required external convective coolant 126, that in turn results in a more efficient engine that produces higher thrust for a given total fluid flowrate to the rocket engine (i.e. propellant flowrate plus coolant flowrate). The coking internal film coolant 120 also provides a simple, low-cost construction and materials as described above. The coking internal film coolant 120 can be injected into the thrust chamber 102 using orifices arranged in a vortex pattern (see FIGS. 2 and 3), injected parallel to the inner wall of the thrust chamber 102, injected perpendicular to the thrust chamber hot-gas-side wall, or injected at an angle to the hot-side wall. To inject the coking internal film coolant 120, any number, shape, size, or orientation of orifices can be used and is up to the discretion of the engine designer. The coking internal film coolant 120 can also be injected in the thrust chamber 102 at as many film coolant injection stations or rings (see FIG. 5) as the designer wishes. The exact orientation, shape, or number of internal film coolant 120 injection orifices is not critical. In some embodiments, the internal film coolant 120 is dispersed along the inside 104 hot-wall surface of the thrust chamber 102.

The heat that gets through the carbon layer deposited by internal film coolant 120 and thus through the thrust chamber 102 is absorbed by external convective coolant 126 that is flowing through one or more coolant tube(s) 124 bonded (using soldering, brazing, welding, or other methods) to the outside wall of the thrust chamber 102. In some embodiments, the external convective coolant 126 is one of any clean-evaporating noncoking fluids (i.e. non-coking at the temperature range when flowing in the external coolant tube) such as water, gaseous hydrogen, liquid hydrogen, propane, methane, or others. The requirement for the external convective coolant 126 is clean evaporation (i.e. does not deposit carbon within the one or more coolant tube(s) 124 when at the temperature range achieved when within the one or more coolant tube(s) 124.) Deposition of carbon or other residue within the one or more coolant tube(s) 124 detrimentally reduces the flowrate of external convective coolant 126 and reduces efficiency of the external convective coolant 126 in absorbing the heat that gets through the thrust chamber 102, thus resulting in undesirably high thrust chamber 102 temperatures, high external convective coolant 126 pressure drops, with attendant reduced flow rates, or both.

The function of internal film coolant 120 is to minimize the amount heat flowing through the thrust chamber 102 so the amount of external convective coolant 126 that is required is also reduced. If the amount of external convective coolant 126 is minimized then the number of coolant tube(s) 124 wrapped around the exterior of the thrust chamber 102 can be reduced to one-to-several. This small number of coolant tube(s) 124, combined with the fact that the coolant tube(s) 124 are wound (coiled), or stacked in small numbers, makes the thrust chamber (102) much easier and cheaper to build.

In other examples of non-limiting variations, the external convective coolant 126 is composed entirely of water that circulates in the coolant tube(s) 126. The water external convective coolant 126 flows through the one or more coolant tube(s) 124 upward from the expansion nozzle 108 to the top of the combustion chamber 106. When water external convective coolant 126 flows to the top of the combustion chamber 106 a number of options of flow are available depending on the exact configuration of the engine. In some examples, the water (external convective coolant) is injected along the internal wall 110 (the hot-gas-side wall) as film coolant in a similar manner that the internal film coolant 120 is injected as film coolant higher up near the main propellant injector 114.

Control of all cooling fluids will be implemented by sequencing valves to release and maintain the flow of cooling fluids to prevent overheating of engine components. Control of the sequencing valves for the cooling fluids are coordinated with timing and operation of the engine main propellant valves and igniter signals. Any method of sequencing of such valves common to or typical of control of rocket engines, such as the use of signals from the rocket vehicle flight computer, or from an independent engine control computer, or other sequencing electronics, can be used to control signals to the coolant control valve(s), and is left to the discretion of the designer.

In some embodiments, sufficient pressure is maintained in all coolant fluids so that flow of the coolant fluids is adequate to cool the engine for the operation of the engine during the flight. This pressure can be generated by a number of means, such as through pumps or pressurized gas systems and is at the discretion of the designer.

The flow of engine coolant fluids can be controlled so that coolant is present when the engine generates heat that, in the absence of cooling fluid, would damage the engine. The flow of engine fluid coolants can be controlled by opening and closing valves that gate coolant flow to the engine. The cooling valves are turned ON and OFF at specific times so that A) coolant fluid is not wasted when not needed and 2) coolant flow prevents engine overheating.

Thus, the timed control of coolant valves are coordinated with the main engine valves that turn ON and OFF the flow of main propellant into the rocket engine, because the heat generated by the burning of the main propellants are removed by the coolant to prevent engine overheating and damage. A conventional method of controlling the sequencing of these valves is to use a small engine control computer that is attached to the rocket. This engine control computer can be the flight computer, which also has overall control of the guidance, navigation and control of the rocket vehicle; or the engine control computer can be a dedicated engine control computer acting as a sequencing device.

One purpose of the engine control computer is to generate electrical control signal commands that can have at least two electrical control states: a high voltage (or current) state and a low state. Some signal-generating electrical systems can also generate intermediate states so that a continuous signal level, from low to high can be generated. These signals are sent from the computer to the valve actuators. A valve actuator is a mechanical device that generates force and motion in two different directions, depending on level of the electrical states the valve actuator receives from the computer. Thus the control states generated by the computer will have the effect of opening and closing the coolant valves.

In some embodiments, the timing of the control signals to the coolant valves is controlled by a software program stored in the engine control computer. The engine control computer has the typical features of any computer, and others common to hardened industrial computers and flight computers on rocket vehicles, namely:

1) A computer application program (software) that is stored in a memory device in the engine control computer.

2) A method of generating the application program and transferring the application program into the engine control computer. In some embodiments, the transfer is performed well in advance of operation of the engine.

3) Sufficient built-in hardware common to all computers, such as volatile memory, registers, program counters, etc, needed to support the operation of a stored program capable of executing the application program.

4) A stored program or set of instructions that can execute the application program.

5) Input and output (I/O) lines which are hardwired to the engine control computer that send low-current/low-voltage electrical signals to and from signal conditioners or amplifiers.

6) Signal conditioners or power amplifiers that adjust the amplitude of signals going to and from the engine control computer to controlled devices and external sensors so that these signals can be received by the engine control computer or external device.

7) Environmental hardening so that the engine control computer can withstand conditions typical of rocket flight, including vibration, elevated temperatures, and vacuum conditions.

8) A communications line leading from outside the rocket vehicle to the engine control computer so that external countdown procedures on the ground can trigger the initiation of the applications program. This can be as simple as a single I/O line or can be a serial or parallel line that communicates to ground control.

The application program generates state outputs to the cooling system valves so that cooling fluid flows and prevents excessive temperatures from occurring in the engine.

Figure 7:
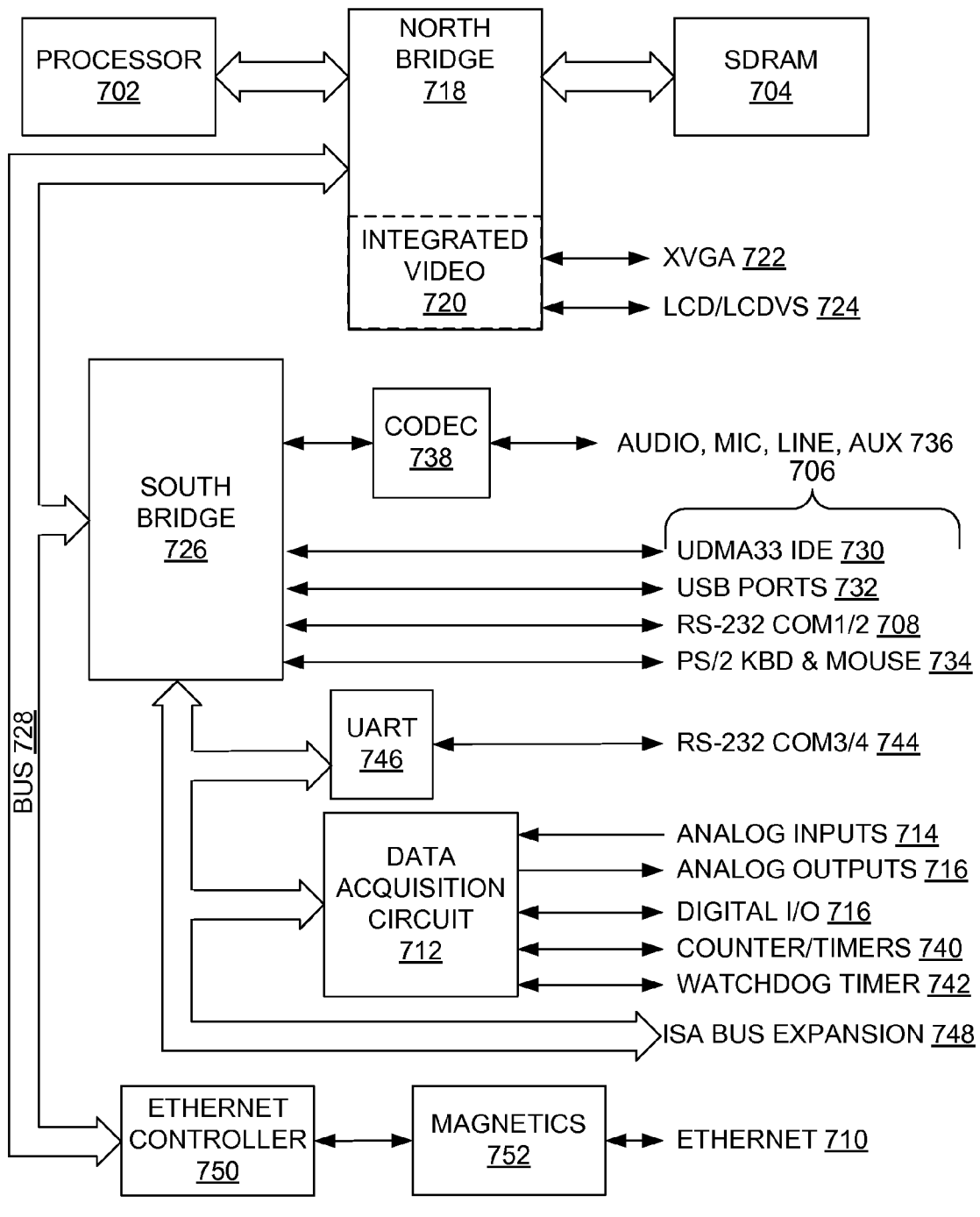
FIG. 7 is a block diagram of an engine control computer in which different embodiments can be practiced.

In some embodiments, method 600 is implemented as a computer data signal embodied in a carrier wave, that represents a sequence of instructions which, when executed by a processor, such as processor 704 in FIG. 7, cause the processor to perform the respective method. In other embodiments, method 600 is implemented as a computer-accessible medium having executable instructions capable of directing a processor, such as processor 704 in FIG. 7, to perform the respective method. In varying embodiments, the medium is a magnetic medium, an electronic medium, or an optical medium.

Hardware and Operating Environment

Figure 8:
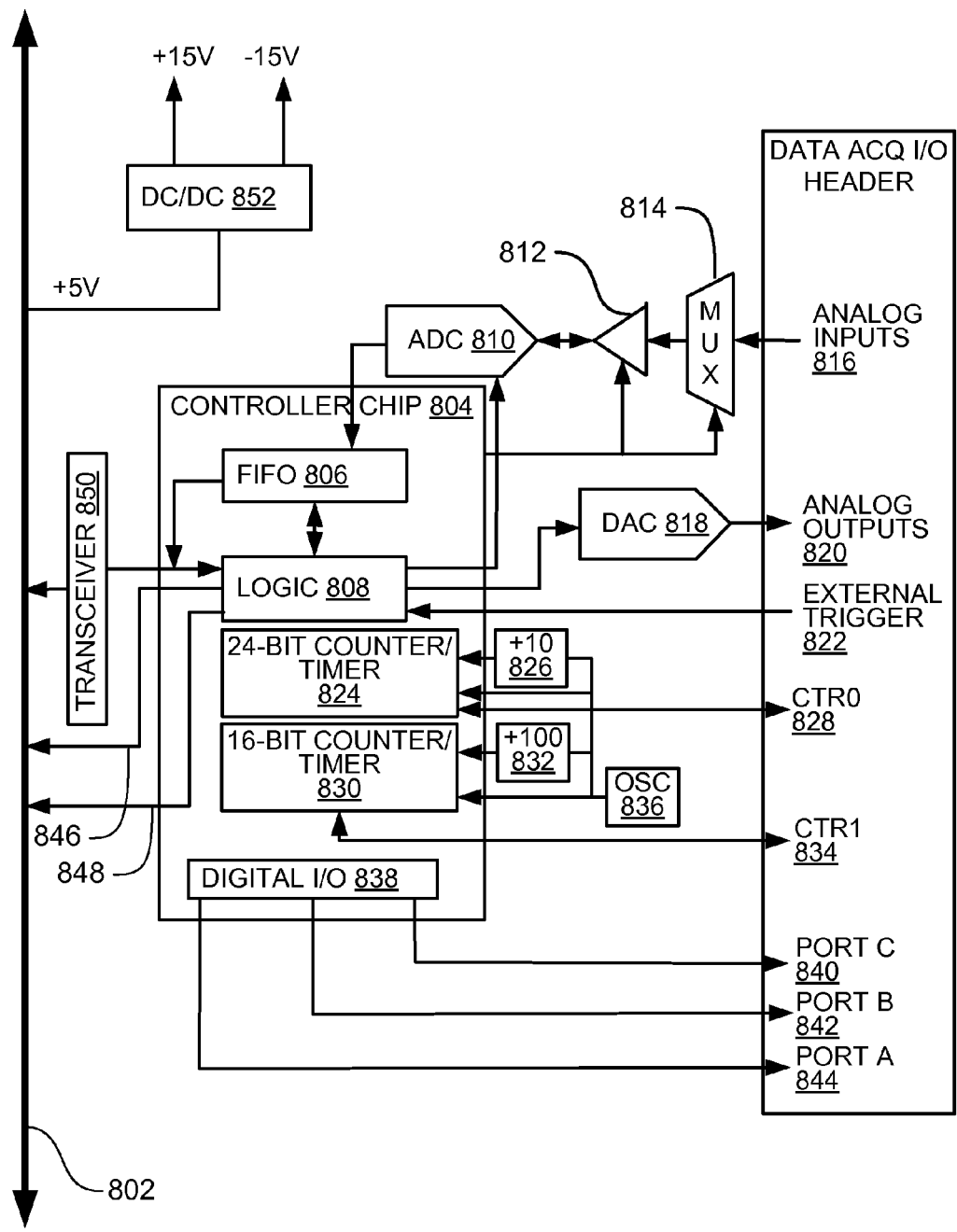
FIG. 8 is a block diagram of a data acquisition circuit of an engine control computer in which different embodiments can be practiced.

The description of FIG. 7 and FIG. 8 provides an overview of electrical hardware and suitable computing environments in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

FIG. 7 is a block diagram of an engine control computer 700 in which different embodiments can be practiced. The engine control computer 700 includes a processor (such as a Pentium III processor from Intel Corp. in this example) which includes dynamic and static ram and non-volatile program read-only-memory (not shown), operating memory 704 (SDRAM in this example), communication ports 706 (e.g., RS-232 708 COM1/2 or Ethernet 710), and a data acquisition circuit 712 with analog inputs 714 and outputs and digital inputs and outputs 716.

In some embodiments of the engine control computer 700, the data acquisition circuit 712 is also coupled to counter timer ports 740 and watchdog timer ports 742. In some embodiments of the engine control computer 700, an RS-232 port 744 is coupled through a universal asynchronous receiver/transmitter (UART) 746 to a bridge 726.

In some embodiments of the engine control computer 700, the Ethernet port 710 is coupled to the bus 728 through an Ethernet controller 750.

With proper digital amplifiers and analog signal conditioners, the engine control computer 700 can be programmed to drive coolant control gate valves, either in a predetermined sequence, or interactively modify coolant flow by opening and closing (or modulating) coolant control valve positions, in response to engine or coolant temperatures. The engine temperatures (or coolant temperatures) can be monitored by thermal sensors, the output of which, after passing through appropriate signal conditioners, can be read by the analog to digital converters that are part of the data acquisition circuit 712. Thus the coolant or engine temperatures can be made available as information that the coolant application program can operate on in as part of its decision-making software that acts to modulate coolant valve position in order to maintain the proper coolant and engine temperature.

FIG. 8 is a block diagram of a data acquisition circuit 800 of an engine control computer in which different embodiments can be practiced. The data acquisition circuit is one example of the data acquisition circuit 712 in FIG. 7 above. Some embodiments of the data acquisition circuit 800 provide 16-bit A/D performance with input voltage capability up to +/−10V, and programmable input ranges.

The data acquisition circuit 800 can include a bus 802, such as a conventional PC/104 bus. The data acquisition circuit 800 can be operably coupled to a controller chip 804. Some embodiments of the controller chip 804 include an analog/digital first-in/first-out (FIFO) buffer 806 that is operably coupled to controller logic 808. In some embodiments of the data acquisition circuit 800, the FIFO 806 receives signal data from and analog/digital converter (ADC) 810, which exchanges signal data with a programmable gain amplifier 812, which receives data from a multiplexer 814, which receives signal data from analog inputs 816.

In some embodiments of the data acquisition circuit 800, the controller logic 808 sends signal data to the ADC 810 and a digital/analog converter (DAC) 818. The DAC 818 sends signal data to analog outputs. The analog outputs, after proper amplification, can be used to modulate coolant valve actuator positions. In some embodiments of the data acquisition circuit 800, the controller logic 808 receives signal data from an external trigger 822.

In some embodiments of the data acquisition circuit 800, the controller chip 804 includes a digital input/output (I/O) component 838 that sends digital signal data to computer output ports.

In some embodiments of the data acquisition circuit 800, the controller logic 808 sends signal data to the bus 802 via a control line 846 and an interrupt line 848. In some embodiments of the data acquisition circuit 800, the controller logic 808 exchanges signal data to the bus 802 via a transceiver 850.

Some embodiments of the data acquisition circuit 800 include 12-bit D/A channels, programmable digital I/O lines, and programmable counter/timers. Analog circuitry can be placed away from the high-speed digital logic to ensure low-noise performance for important applications. Some embodiments of the data acquisition circuit 800 are fully supported by operating systems that can include, but are not limited to, DOS™, Linux™, RTLinux™, QNX™, Windows 98/NT/2000/XP/CE™, Forth™, and VxWorks™ to simplify application development.

Conclusion

An economical liquid-fueled propulsion system is described. A technical effect of the system is sufficiently high thrust from a propulsion system that is economical to manufacture. Although specific embodiments are illustrated and described herein, it will be appreciated by those of ordinary skill in the art that any arrangement which is calculated to achieve the same purpose can be substituted for the specific embodiments shown. This application is intended to cover any adaptations or variations.

The systems, methods and apparatus described herein a low-cost rocket engine technology that can be used to produce rocket engines of any size or propellant combination for private, commercial, or government aerospace programs. The economical engine systems, methods and apparatus described herein will increase the confidence of these organizations in obtaining rocket engines at greatly reduced cost and procurement times. In addition, the economical systems, methods and apparatus described herein reduce the procurement lead time of rocket engines and the procurement costs. The systems, methods and apparatus described herein provide faster and cheaper development and reproduction of rocket engines of any size thrust or using any propellant combination (i.e. combination of fuel and oxidizer).

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to different thrust chambers 102, inside walls 104, combustion chambers 106, expansion nozzles 108, expansion nozzle interiors 110, expansion nozzle exteriors 112, main propellant injectors 114, oxidizers 116, fuels 118, internal film coolants 120, coolant tubes 124, external convective coolants 126 and injectors 128.

The terminology used in this application meant to include injectors, fuel, thrust chambers and alternate technologies which provide the same functionality as described herein

We claim:

1. A method to cool a rocket engine, the method comprising:
   injecting a coking fluid into a thrust chamber of the rocket engine; and
   injecting at least a portion of a non-coking fluid into the thrust chamber of the rocket engine,
   wherein at least one of the two fluids is not one of a plurality of main propellants,
   wherein the coking fluid is in a range of about 1% to about 5% of the total of the coking fluid and the non-coking fluid and the plurality of main propellants.

2. The method of claim 1, wherein injecting at least a portion of the non-coking fluid further comprises:
   injecting at least a portion of the non-coking fluid into an expansion nozzle of the thrust chamber.

3. The method of claim 1, wherein the coking fluid is not the non-coking fluid.

4. The method of claim 1 wherein the thrust chamber further comprises:
   a thrust chamber fabricated from low cost construction methods and processes.

5. The method of claim 1 wherein the thrust chamber further comprises:
   metal selected from the group consisting of aluminum, steel, stainless steel, an austenitic nickel-based superalloy, copper, bronze, alloys and mixtures thereof and metal and plastic composites thereof.

6. The method of claim 1 wherein at least a portion of the thrust chamber further comprises:
   a simple shell thrust chamber construction.

7. The method of claim 1, wherein the method further comprises:
   flowing the non-coking fluid exterior to a wall comprising at least a portion of the combustion chamber;
   flowing the non-coking fluid exterior to a wall comprising at least a portion of the rocket engine; and
   flowing the non-coking fluid exterior to a wall comprising at least a portion of the expansion nozzle of the rocket engine.

8. The method of claim 7 wherein flowing the non-coking fluid further comprises:
   flowing the non-coking fluid through not more than a few fluid tubes.

9. The method of claim 7, wherein flowing the non-coking fluid further comprises:
   circulating the non-coking fluid.

10. The method of claim 1, wherein the non-coking fluid further comprises:
    not one of at least one of the plurality of main propellants and not the coking fluid.

11. The method of claim 1, wherein the non-coking fluid further comprises:
    water.

12. The method of claim 1, wherein the coking fluid is about 2.5% of the total of the coking fluid and the non-coking fluid and the plurality of main propellants.

13. The method of claim 1, wherein the non-coking fluid is about 1% to about 5% of the total of the coking fluid and the non-coking fluid and the plurality of main propellants.

14. The method of claim 1, wherein the coking fluid further comprises:
    a coking hydrocarbon film fluid.

15. The method of claim 1, further comprising:
    operating a main propellant injector independently from at least one fluid tube.

16. A method to cool a rocket engine, the method comprising:
    injecting a coking fluid into a thrust chamber of the rocket engine; and
    injecting at least a portion of an non-coking fluid into the thrust chamber of the rocket engine,
    wherein the coking fluid is not one of at least one of a plurality of main propellants,
    wherein the non-coking fluid is not the one of at least one of the plurality of main propellants,
    wherein the coking fluid is about 3.5% of the total of the coking fluid and the non-coking fluid and the plurality of main propellants.

17. The method of claim 16, wherein the non-coking fluid is non-coking at the expected temperatures in an external fluid tube.

18. The method of claim 16, wherein the thrust chamber further comprises:
    a thrust chamber fabricated from common construction materials.

19. The method of claim 16, wherein the coking fluid is about 3.5% of the total of the coking fluid and the non-coking fluid and the plurality of main propellants and wherein the non-coking fluid is about 2.5% of the total of the coking fluid and the non-coking fluid and the plurality of main propellants.

* * * * *